United States Patent [19]

Fries

[11] 4,097,928
[45] Jun. 27, 1978

[54] APPARATUS FOR FEEDING SYNTHETIC MATERIAL TO A MOULD

[75] Inventor: Bernd Fries, Nuremberg, Germany

[73] Assignee: DEMAG Kunststofftechnik Zweigniederlassung der DEMAG AG, Nuremberg, Germany

[21] Appl. No.: 681,237

[22] Filed: Apr. 28, 1976

Related U.S. Application Data

[63] Continuation of Ser. No. 503,116, Sep. 4, 1974, abandoned.

[30] Foreign Application Priority Data

Sep. 14, 1973 Germany .............................. 2346348

[51] Int. Cl.² .......................... B28B 13/02; B01F 5/00
[52] U.S. Cl. .................................................. 366/336
[58] Field of Search ............ 259/4 AB; 425/4 R, 4 C, 425/245 R

[56] References Cited

U.S. PATENT DOCUMENTS

| 3,130,452 | 4/1964 | Heumann | 259/4 AB X |
| 3,376,023 | 4/1968 | Lage | 259/4 AB |
| 3,577,308 | 5/1971 | Van Drunen et al. | 259/4 AB X |
| 3,709,640 | 1/1973 | Boden et al. | 425/4 R |
| 3,788,337 | 1/1974 | Breer | 425/4 R |
| 3,847,526 | 11/1974 | Fries | 425/245 R |
| 3,894,823 | 7/1975 | Hanning | 425/245 R |

FOREIGN PATENT DOCUMENTS

| 2,146,181 | 3/1973 | Germany. |
| 1,154,561 | 6/1969 | United Kingdom. |

Primary Examiner—Billy S. Taylor

[57] ABSTRACT

This invention relates to apparatus for feeding synthetic material to a mould and includes a mixing chamber and a sprue runner leading from the mixing chamber to the mould. The sprue runner is branched so that the material fed from the mixing chamber is divided into at least two equal parts, the branches of the sprue runner leading to a common section in which the divided parts of the material are recombined prior to feeding to the mould. The branches of the sprue runner are also provided with constrictions.

8 Claims, 5 Drawing Figures

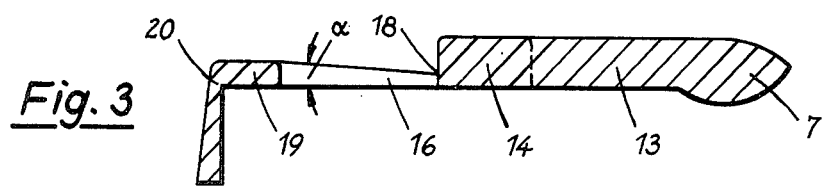
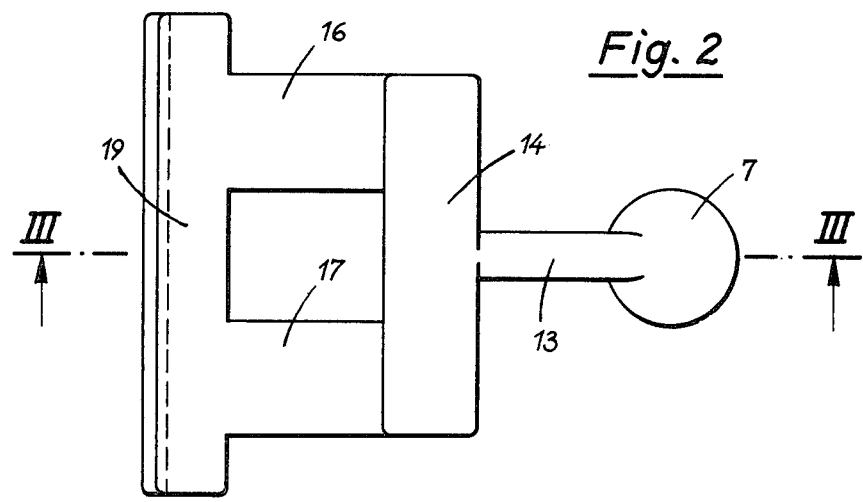
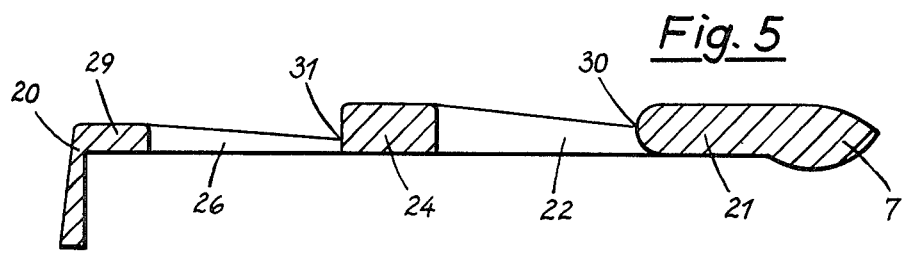
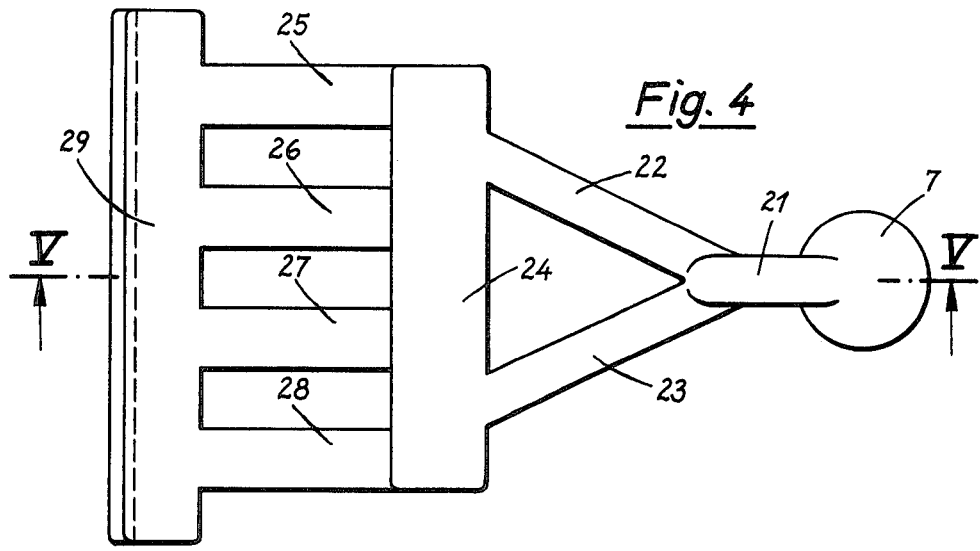

APPARATUS FOR FEEDING SYNTHETIC MATERIAL TO A MOULD

This is a continuation of application Ser. No. 503,116, filed Sept. 4, 1974, and now abandoned.

This invention relates to apparatus for feeding synthetic material to a mould.

The quality of mouldings produced by so-called reaction moulding depends essentially on the liquid stream of material entering the mould having as laminar as possible a flow characteristic and a uniform distribution of velocity over its entire cross-section. Creastion of these conditions is primarily confronted by the fact that the components forming the synthetic material are brought together under elevated pressure in the mixing chamber which leads to turbulence in the liquid stream of material. Since this pressure must be reduced to atmospheric pressure upon entry into the mould, difficulty is encountered in preventing vapourisation of the comparatively volatile materials contained in the mixture, such as for example, activators added for the purpose of cell-forming in the synthetic material.

In an attempt to overcome these difficulties German Offenlegungsschrift No. 2,146,181 proposes the use of a sprue runner which flares toward the mould, and which includes at least one but preferably more than one, restriction formed therein. To obtain a uniform distribution of velocities across the stream of material as it leaves the sprue runner and enters the mould, despite the deviation which the individual strands experience to varying degrees at the restrictions, it is necessary to give a specific geometric shape to the attachments or offset portions which form the restriction. Thus, in one embodiment for example, the offset portion of the sprue channel which forms the resriction is of arcuate configuration. This consideration, when designing the constriction, involves increased manufacturing costs.

According to the present invention there is provided apparatus for feeding synthetic material to a mould, such apparatus comprising a mixing chamber for mixing the materials to be moulded and a sprue runner for feeding the materials from the mixing chamber to the mould, the sprue runner being branched so that material fed from the mixing chamber is divided into at least two equal parts, the branches of the sprue runner leading to a common section in which the divided parts of the material are recombined prior to feeding to the mould, each branch of the sprue runner having at least one constriction therein, with all the branches having the same number and configuration of constrictions.

By using the present design of the sprue runner the material is divided into identical streams which flow over a longer flow path than in the known embodiment of the sprue runner, which ultimately has the effect of a largely uniform distribution of velocity over the exit cross-section of the sprue runner. For this purpose it is found advantageous for the points of branching and combining of the individual streams to be disposed symmetrically with respect to the direct line of connection between the centre of the mixing chamber outlet and the mould inlet. The sprue runner is thus composed of branches which extend at a spacing from one another and sections where the branches are again joined to one another at their ends, it being possible for the division into a plurality of branches and their re-combining to occur several times.

In the present design of the sprue runner the principle of alternating throttling and expansion, as described in the above-mentioned German Offenlegungsschrift may be employed.

In use of the present apparatus it is no longer necessary to provide restrictions which have configurations that are relatively costly to produce. In the present case the restrictions can be simply formed by the cross-section suitably tapering in the direction of flow, it being possible for the cross-section transversely of the flow diection to retain regular (rectangular) form. In the interest of as slight as possible a deviation of the streams at the restrictions the taper, with respect to the flow direction, should not exceed 5°. At a steeper angle there is the risk of flow detaching. The aperture angle $\alpha$ is preferably between 3° and 5°.

Illustrative embodiments of the invention will now be described with reference to the accompanying drawings, in which:

FIG. 2 shows a view from above of a hardened sprue the shape of which reproduces the configuration of the sprue runner;

FIG. 3 shows a section along line III—III of FIG. 2;

FIG. 4 shows a plan view of a further hardened sprue from which a modified design of a sprue runner is apparent; and FIG. 5 shows a section along line V—V of FIG. 4.

Figure 1:
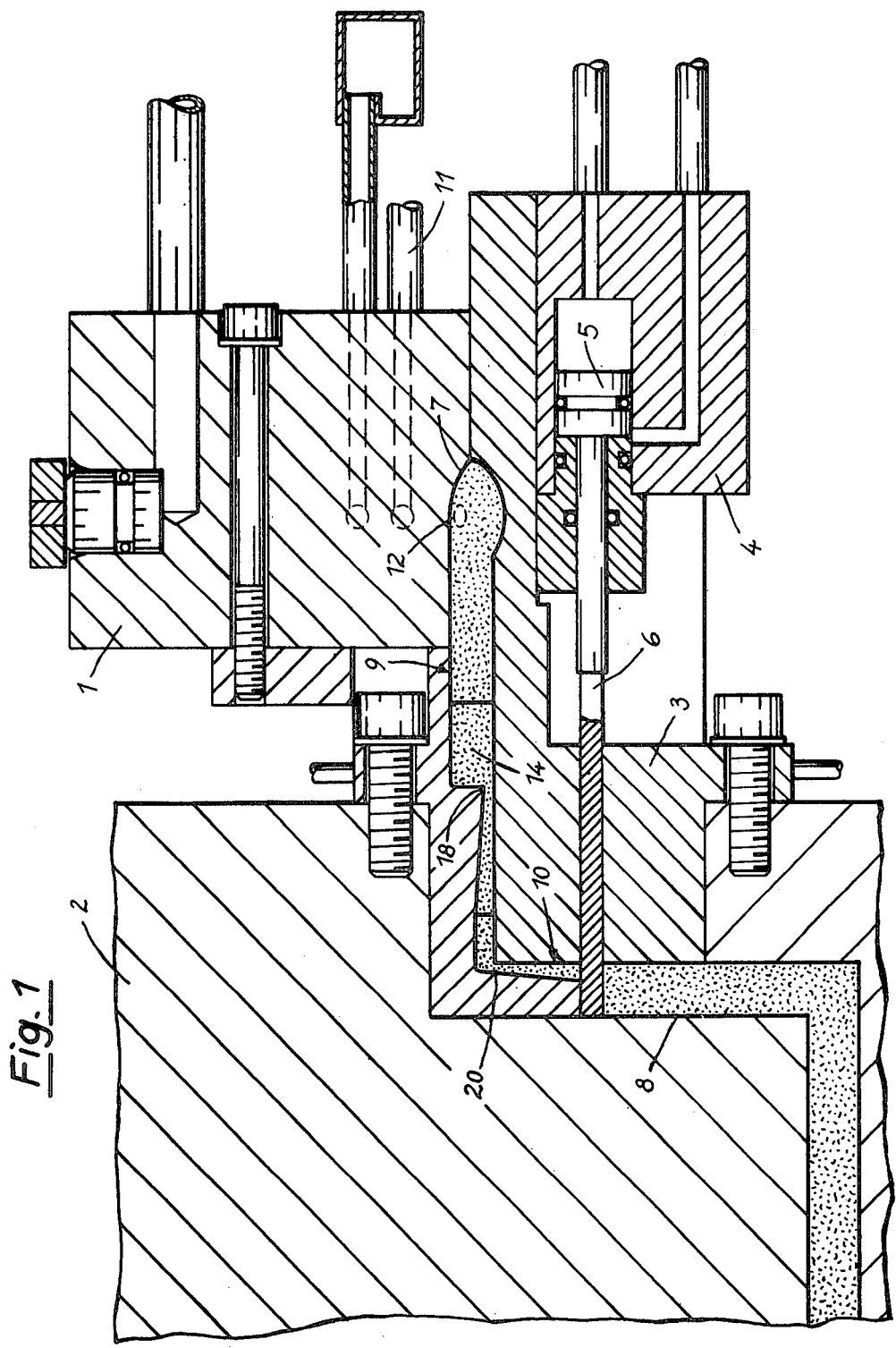
FIG. 1 shows schematically, in longitudinal section, a feedhead secured to a mould.

In the description the term "hardened sprue" refers to the moulding obtained if material were allowed to harden in the mixing chamber and sprue runner.

Referring now to FIG. 1 there is shown schematically a feedhead device which essentially comprises a mixing head, 1, a block 3 threadedly secured to a mould 2 and a control block 4 in which a piston 5 acted upon by a pressure medium which is located for actuating a shut-off slide valve 6. The mixing head 1 and the block 3 form a mixing chamber 7 to which is connected a sprue runner 9 extending through the block 3 to a mould cavity 8 of the mould 2. The sprue runner opens into a space 10 into which the shut-off slide valve 6 extends when the mould has been filled.

The components which after having been mixed, form a synthetic material to be processed by chemical reaction in the mould 2, are fed under pressure into the mixing chamber 7 via lines 11 of which only one is shown, and via valves, not shown, through bores 12, of which also only one is shown in the drawing. A thorough mixing of the individual components occurs in the mixing chamber 7.

The configuration of the sprue runner is apparent from the hardened sprues shown in FIGS. 2 and 5, wherefore in the following description of the hardened sprues and of the sprue runner identical reference symbols are used for sections which correspond to one another.

In the sprue runner corresponding to the hardened sprue of FIGS. 2 and 3 a runner section 13 of constant cross-section leads from the mixing chamber 7 and opens into a section 14 extending at a right angle to the section 13. From the section 14 two parallel extending branches 16, 17 extend at a right angle. As is apparent from FIG. 3, there is a narrowing at the transition from section 14 to section 16 so that a constriction 18 is formed; in corresponding manner a constriction is also formed at the transition from section 14 to section 17, and in the following description it is always to be taken that the individual branches including the constrictions provided therein, are formed in the same manner, without this being specifically described.

Downstream of the constricton 17 branch 16 widens to a diffusor of rectangular cross-section, the aperture angle α being kept relativey small.

The two branches 16 and 17 open into a section 19 extending at a right angle and it can be seen in FIG. 3 that the section 19 is also bent downwardly at a right angle. At the bend a constriction 20 has again been created by a narrowing of the passage cross-section. The bend of the sprue runner affords the advantage that a change of direction of the stream of material, which is necessary in view of the shape of the moulding to be produced, occurs exteriorly of the mould cavity (cf. FIG. 1).

The embodiment shown in FIGS. 4 and 5 differs from the precedng one in that the deviation of the stream of material into various branches is performed twice. The runner section 21 going off directly downstream of the mixing chamber 7 opens into two branches 22, 23 disposed at an angle to one another and which in turn terminate in a section 24 where the stream of material is subdivided into four branches 25, 26, 27, 28 which are eventually reunited at a section 29 which is designed corresponding to the section 19 of the embodiment of FIGS. 2 and 3. At the transition from the runner section 21 to the branches 22, 23 there is provided a constriction 30 and at the transitions from the runner section 24 to the individual branches 25 to 28 there are provided, corresponding to the embodiment of FIGS. 2 and 3, constrictions 31 which are formed in identical manner by narrowing the runner cross-section.

I claim:

1. Apparatus for feeding synthetic material composed of at least two constituents to a mould, such apparatus comprising a mixing chamber, means for feeding the constituents under pressure to the mixing chamber for mixing the same therein, and a sprue runner, said sprue runner having an exit of given cross-sectional area being arranged for feeding the material from said mixing chamber to said mould from said exit at substantially atmospheric pressure, the sprue runner extending from a single mixing chamber outlet and including branch means, said branch means having at least two separate branches and being arranged so that material fed from the mixing chamber is divided into at least two equal parts separated from one another, the sprue runner further including a common section defined in part at its inlet end by a flat, plane surface, the separate branches of said branch means leading to said common section in which the divided parts of the material are recombined prior to feeding to the mould, each branch of said branch means being of equal length, opening into said common section via a respective opening in said flat, plane surface and having at least one constriction therein with all the branches having the same number and configuration of constrictions, whereby material fed to said mould has a largely uniform distribution of velocity over said cross sectional area of said exit.

2. Apparatus according to claim 1, in which a constriction is formed at the inlet of each branch of said branch means.

3. Appparatus according to claim 1, in which the said common section is bent in configuration.

4. Apparatus for feeding synthetic material composed of at least two constituents to a mould, such apparatus comprising a mixing chamber, means for feeding the constituents under pressure to the mixing chamber for mixing the same therein, and a sprue runner, said sprue runner having an exit of given cross-sectional area being arranged for feeding the material from said mixing chamber to said mould from said exit at substantially atmospheric pressure, the sprue runner extending from a single mixing chamber outlet and including branch means, said branch means having at least two separate branches and being arranged so that material fed from the mixing chamber is divided into at least two equal parts separated from one another, the sprue runner further including a common section, the separate branches of said branch means leading to said common section in which the divided parts of the material are recombined prior to feeding to the mould, each branch of said branch means being of equal length, opening into said common section via a respective opening having at least one constriction therein with all the branches having the same number and configuration of constrictions, whereby material fed to said mould has a largely uniform distribution of velocity over said cross sectional area of said exit.

5. Apparatus according to claim 4, in which a constriction is formed at the inlet of each branch of said branch means.

6. Apparatus according to claim 5, in which each cross-section of each branch downstream of the constriction constantly increases over a predetermined distance to provide an aperture angle of between 3° and 5°.

7. Apparatus according to claim 4, in which the said common section is bent in configuration.

8. Apparatus according to claim 7, which includes a constriction formed at said bend.

* * * * *